United States Patent
Suzuki (10) Patent No.: US 11,954,543 B2
(45) Date of Patent: Apr. 9, 2024

(54) WIRELESS TAG READER AND BASKET DEVICE

(71) Applicant: TOSHIBA TEC KABUSHIKI KAISHA, Tokyo (JP)

(72) Inventor: Shigeaki Suzuki, Gotemba Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 238 days.

(21) Appl. No.: 17/518,516

(22) Filed: Nov. 3, 2021

(65) Prior Publication Data
US 2022/0230032 A1 Jul. 21, 2022

(30) Foreign Application Priority Data
Jan. 21, 2021 (JP) .................. 2021-008284

(51) Int. Cl.
G06K 19/00 (2006.01)
A45C 3/04 (2006.01)
G06K 19/07 (2006.01)
G06K 19/077 (2006.01)
G07G 1/00 (2006.01)

(52) U.S. Cl.
CPC ....... *G06K 19/005* (2013.01); *G06K 19/0704* (2013.01); *G06K 19/07728* (2013.01); *G07G 1/0081* (2013.01); *G07G 1/009* (2013.01); *A45C 3/04* (2013.01)

(58) Field of Classification Search
CPC ............. G06K 19/005; G06K 19/0704; G06K 19/07728; G07G 1/0081
See application file for complete search history.

(56) References Cited

U.S. PATENT DOCUMENTS

| | | |
|---|---|---|
| 2007/0008068 A1 | 1/2007 | Brice et al. |
| 2010/0134252 A1 | 6/2010 | Sandler et al. |
| 2012/0038515 A1 | 2/2012 | Truitt et al. |
| 2013/0126611 A1 | 5/2013 | Kangas et al. |
| 2018/0307877 A1 | 10/2018 | Sundaresan et al. |
| 2018/0336383 A1 | 11/2018 | Roth |
| 2020/0034585 A1 | 1/2020 | Lu et al. |
| 2022/0004723 A1* | 1/2022 | Suzuki ............... G06K 7/10009 |

FOREIGN PATENT DOCUMENTS

| | | |
|---|---|---|
| DE | 102004041491 A1 | 3/2006 |
| DE | 102013111621 A1 | 1/2015 |
| EP | 2808831 A1 | 12/2014 |
| EP | 3355406 A1 | 8/2018 |

OTHER PUBLICATIONS

Extended European Search Report dated May 2, 2022 in corresponding European Patent Application No. 21212229.5, 8 pages.

* cited by examiner

*Primary Examiner* — Daniell L Negron
(74) *Attorney, Agent, or Firm* — Kim & Stewart LLP (57) ABSTRACT

A wireless tag reader includes a casing, an antenna in the casing and through which a radio wave is transmitted to and received from a wireless tag on an article, a control device in the casing and configured to read tag information stored in the wireless tag based on a radio wave received by the antenna, and an elastic member between the casing and the antenna so as to permit the antenna to be movable with respect to the casing.

17 Claims, 5 Drawing Sheets

WIRELESS TAG READER AND BASKET DEVICE

CROSS-REFERENCE TO RELATED APPLICATION

This application is based upon and claims the benefit of priority from Japanese Patent Application No. 2021-008284, filed on Jan. 21, 2021, the entire contents of which are incorporated herein by reference.

FIELD

Embodiments described herein relate generally to a wireless tag reader, a basket device, and a checkout system.

BACKGROUND

In recent years, radio frequency identification (RFID) technology has started to be utilized in a distribution systems, logistics systems, and the like. In such systems, tag information stored in an RFID tag (wireless tag) attached to an article, item, or commodity is read and is used for tracking the article, item or commodity.

For example, in a large retailer such as a supermarket, a shopping cart to which a wireless tag reader is attached has been proposed. When a customer puts a commodity in such a shopping cart, commodity information can be read from the wireless tag on the commodity by the wireless tag reader. The commodity information read by the wireless tag reader is transferred from the wireless tag reader to a checkout device according to an operation of the customer during checkout. With this configuration, the customer can perform checkout or payment with the checkout device for commodities put in the shopping cart. By adopting a shopping cart equipped with a wireless tag reader, commodity information registration (hereinafter, also referred to as commodity registration) needed for the customer to perform checkout can be easily performed.

However, tag information may not always be read from a wireless tag on a commodity depending on a positional relationship between the antenna of the wireless tag reader and the wireless tag. For example, if the antenna surface of the wireless tag reader and the antenna surface of the wireless tag are perpendicular or substantially perpendicular, reading performance of the wireless tag reader is deteriorated. Since a commodity can be put in the shopping cart by the customer in any orientation, the reading performance may sometimes be poor due to the positional relationship between the wireless tag and the wireless tag reader.

DETAILED DESCRIPTION

Embodiments provide a wireless tag reader and a basket device capable of improving performance for reading tag information.

In general, according to one embodiment, a wireless tag reader includes a casing, an antenna in the casing and through radio waves are transmitted to and received from a wireless tag on an article. A control device is in the casing and configured to read tag information stored in the wireless tag based on a radio wave received by the antenna. An elastic member is between an inner surface of the casing and the antenna.

Hereinafter, a wireless tag reader and a basket device according to embodiments will be described in detail with reference to the drawings. The present disclosure is not limited to the embodiments described below. For example, in the embodiments described below, a wireless tag reader and a shopping basket used in a mass retailer (hereinafter, also referred to as a store) such as a supermarket and to which the wireless tag reader is attached will be described. However, the wireless tag reader can be attached to any type of device that can store commodities for sale such as a shopping cart. Additionally, the wireless tag reader can be attached to a device for storing mechanical or electrical parts in a factory or the like.

First Embodiment

Figure 1:
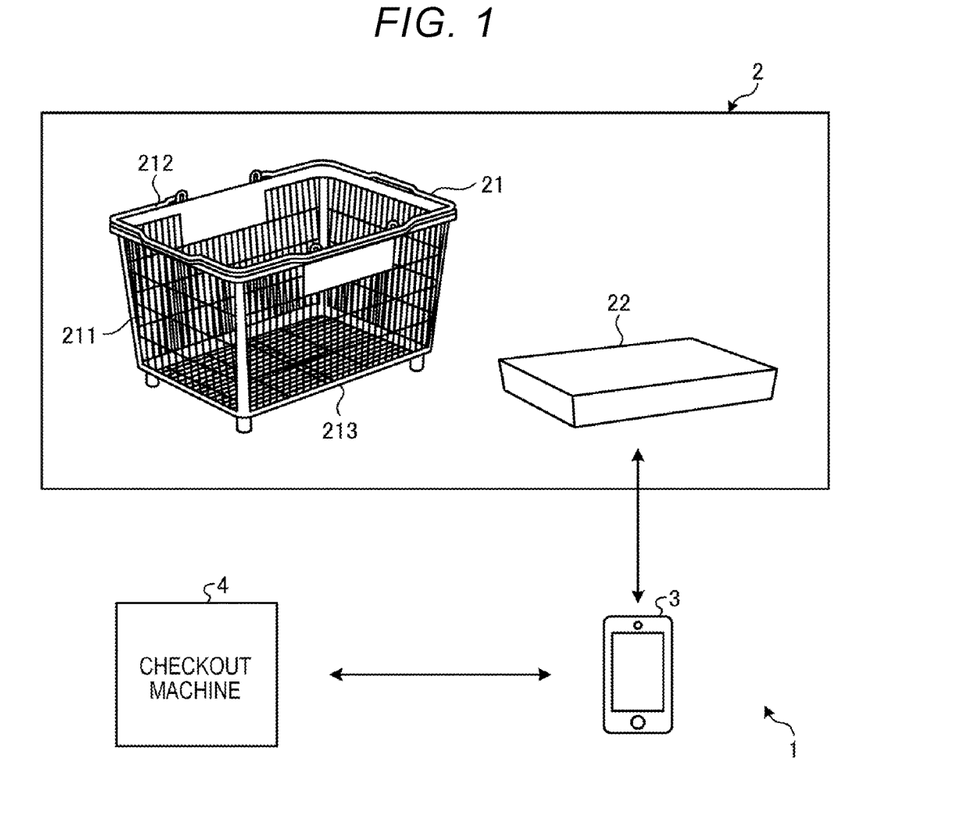
FIG. 1 is a diagram illustrating a checkout system including a basket device according to a first embodiment.

First, a first embodiment will be described. FIG. 1 is a diagram illustrating a checkout system 1 including a basket device 2 according to the first embodiment. The checkout system 1 includes the basket device 2, a portable terminal 3, and a checkout machine 4.

The basket device 2 includes a shopping basket 21 and a wireless tag reader 22 that is detachably held in the shopping basket 21.

A large number of shopping baskets 21 are provided in a store and carried by customers moving in the store. The shopping basket 21 includes a holding portion 211 with the upper side open and a grip portion 212 rotatably attached to an upper end portion of the holding portion 211. The holding portion 211 is formed in a grid pattern and holds commodities purchased by the customer inside. A wireless tag stores commodity information related to the commodity to which the wireless tag is attached. The grip portion 212 is gripped by the customer during shopping.

Figure 2:
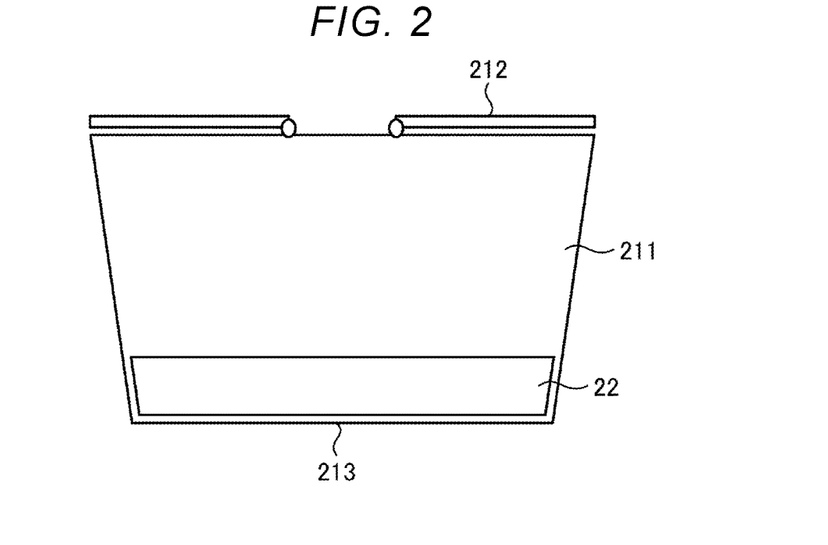
FIG. 2 is a diagram illustrating an outline of a basket device to which a wireless tag reader is attached.

The wireless tag reader 22 is detachably held in the shopping basket 21. The wireless tag reader 22 is attached to the shopping basket 21 by a customer or a clerk. For example, the wireless tag reader 22 is put in the holding portion 211 through an upper opening of the holding portion 211 and, as illustrated in FIG. 2, is placed on a bottom surface portion 213 of the shopping basket 21 and is held in the shopping basket 21 by fitting an outer peripheral surface thereof into the holding portion 211. Once the customer's shopping is finished, the shopping basket 21 is returned to the clerk, who removes the wireless tag reader 22 from the shopping basket 21 and sets the wireless tag reader 22 in a charger to charge a battery (see FIG. 3) provided in the wireless tag reader 22. By making the wireless tag reader 22 detachable from the shopping basket 21, a wireless tag reader 22 does not need to be attached to every one of the shopping baskets 21 in the store, and the financial burden on the store can be reduced. The wireless tag used in this embodiment is a passive type wireless tag that operates (responds) by using radio waves from the wireless tag reader 22 as a power source.

The portable terminal 3 is a smartphone, a tablet terminal, or the like owned by a customer or rented by a store, and stores an application program prepared for the checkout system 1. The portable terminal 3 executes various processing related to commodity registration and checkout processing according to a customer's operation. For example, the portable terminal 3 acquires and stores commodity information read from a wireless tag by the wireless tag reader 22 by wireless communication. The portable terminal 3 transmits the stored commodity information to the checkout machine 4 by wireless communication. The commodity information includes a commodity code, a price, a commodity name, and the like of the commodity to which the wireless tag is stuck.

The checkout machine 4 is a so-called self-service-type checkout machine with which, for example, the customer performs a checkout operation by himself or herself. The checkout machine 4 executes checkout processing by cash payment or cashless payment such as credit payment based on the commodity information received from the portable terminal 3. Checkout processing is processing of making payment for the commodities purchased by the customer.

Figure 3:
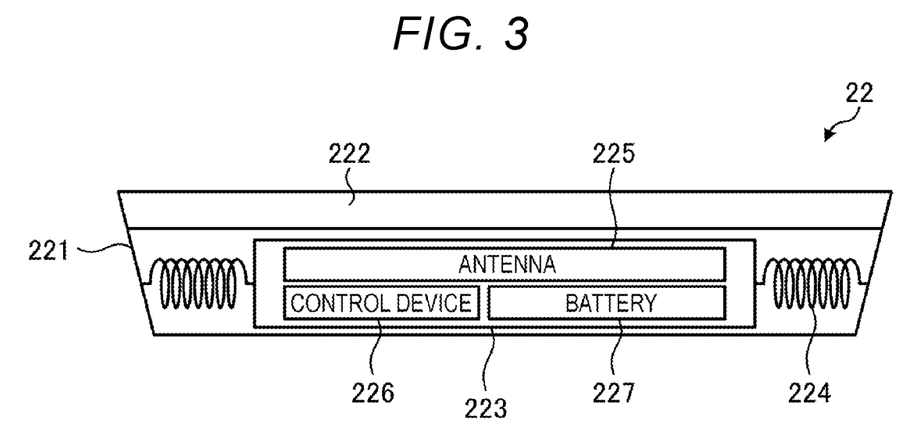
FIG. 3 is a diagram schematically illustrating an internal structure of a wireless tag reader.
Figure 4:
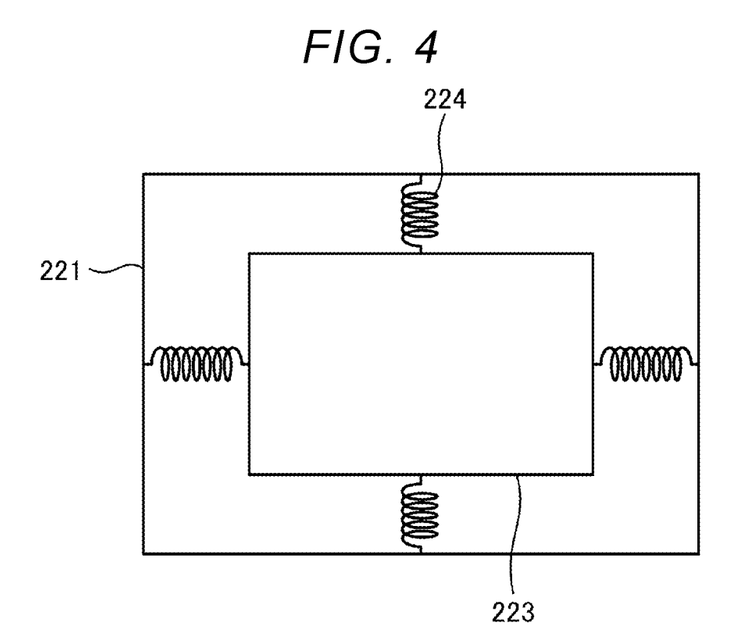
FIG. 4 is a diagram schematically illustrating a structure to hold a wireless tag reader when viewed from an upper surface thereof.

Next, a configuration of the wireless tag reader 22 will be described in detail. FIG. 3 is a diagram schematically illustrating an internal structure of the wireless tag reader 22, and FIG. 4 is a diagram schematically illustrating a structure of the wireless tag reader 22 when viewed from the upper surface thereof. The wireless tag reader 22 includes a casing 221.

The casing 221 can be detachably attached to the shopping basket 21. The casing 221 is formed in a shape that fits into the shopping basket 21 (for example, trapezoidal cross-sectional shaped), includes a placement portion 222 on the upper surface thereof, and houses a main body portion 223 inside thereof. The placement portion 222 is made of a material, for example, resin, that transmits the radio wave used by the wireless tag reader 22. The placement portion 222 has an upper surface that is flat, and commodities to be purchased by the customer are placed thereon while the wireless tag reader 22 is held by the shopping basket 21.

The main body portion 223 is formed in a substantially rectangular parallelepiped shape, for example, and one ends of coil springs 224 are respectively attached to four sides of the outer peripheral surface thereof. The other ends of the coil springs 224 are respectively attached to the inner peripheral surface of the casing 221. With this configuration, the main body portion 223 is elastically supported in the casing 221 via the coil springs 224. The main body portion 223 is guided in a direction along the placement portion 222 by a guide or the like formed on the casing 221. For that reason, as the coil springs 224 extend and contract, the main body portion 223 can move in the direction along the placement portion 222 with respect to the casing 221. When the wireless tag reader 22 is mounted on the shopping basket 21, the main body portion 223 can move along the bottom surface portion 213. The main body portion 223 is formed in a hollow shape, and houses an antenna 225, a control device 226, and a battery 227. Each of the coil springs 224 is an elastic member that elastically supports the antenna 225 on the casing 221, and elastically supports the main body portion 223 on the casing 221. The elastic member is not limited to a spring member and may be made of rubber, other elastic material, or the like.

The antenna 225 is provided in the casing 221 and transmits and receives radio waves to and from a wireless tag stuck to a commodity. Specifically, the antenna 225 transmits a radio wave to a commodity placed on the placement portion 222, that is, a wireless tag stuck to the commodity in the holding portion 211, and receives a response wave transmitted by the wireless tag. In the following description, a radio wave transmitted by the antenna 225 may be referred to as an inquiry wave, and a radio wave received by the antenna 225 from the wireless tag may be referred to as a response wave.

The control device 226 includes various electrical components for controlling the wireless tag reader 22. The battery 227 supplies power to each component of the wireless tag reader 22. The battery 227 is charged when the wireless tag reader 22 is placed on a charging stand or the like.

As described above, the main body portion 223 is elastically supported in the casing 221. For that reason, if a customer moves with the shopping basket 21 during shopping, an inertial force acts on the main body portion 223 due to a change in acceleration accompanying the movement, and the coil springs 224 extend and contract. With this configuration, the main body portion 223 moves in the direction along the placement portion 222 with respect to the casing 221.

In one embodiment, the wireless tag reader 22 may be held on a side surface portion of the shopping basket 21. In such a case, for example, the wireless tag reader 22 is disposed so that the antenna 225 faces the inside of the holding portion 211. If a customer moves with the shopping basket 21, the shopping basket 21 also moves in the vertical direction, and thus the antenna 225 moves along the side surface of the shopping basket 21 due to the inertial force applied in the vertical direction. Hereinafter, the movement of the antenna 225 and the main body portion 223 with respect to the casing 221 may be simply referred to as movement.

As described above, the main body portion 223 including the antenna 225 is attached to the casing 221 via the coil springs 224, so that the main body portion 223 can be moved along the bottom surface portion 213 of the shopping basket 21. A movable distance of the antenna 225 can be set by an elastic force of the coil springs 224. Although the movable distance varies depends on the usage environment and the like, according to an experimental result, the antenna should be movable by, for example, 2 cm or more in order to change the positional relationship between the antenna 225 and the wireless tag to improve reading performance. Radio wave intensity of the inquiry wave transmitted from the antenna 225 is set so that the wave can reach a wireless tag disposed inside the holding portion 211 and cannot reach any wireless tag stuck to a commodity disposed on a commodity display shelf outside the holding portion 211.

Figure 5:
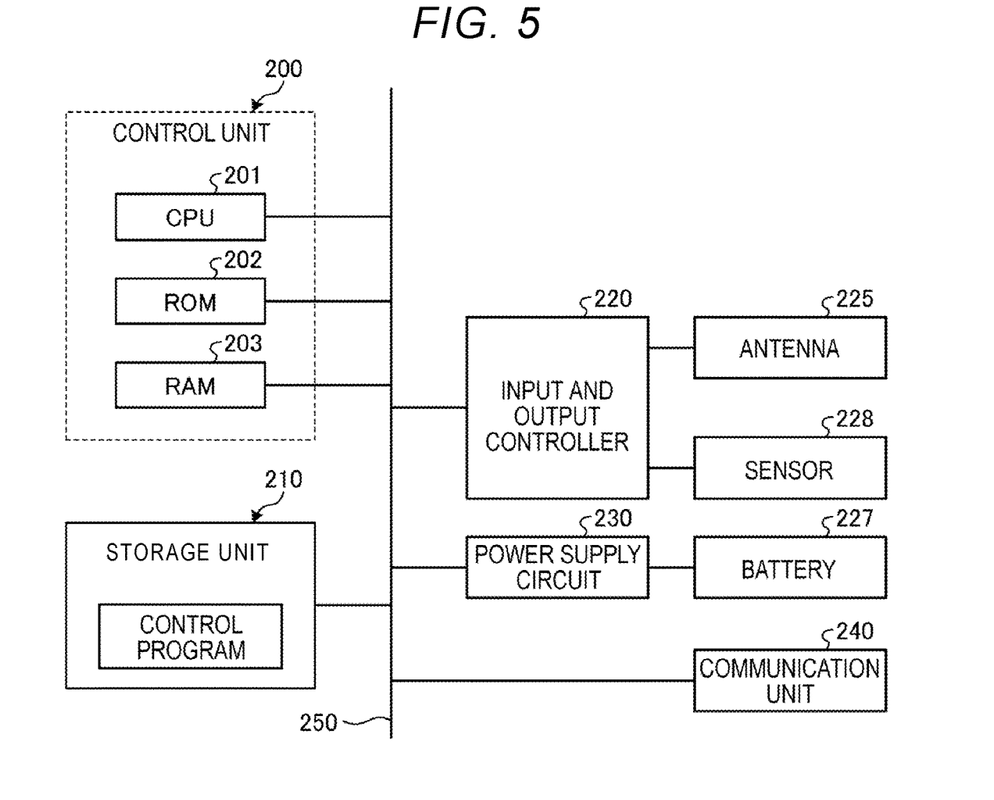
FIG. 5 is a hardware block diagram of a wireless tag reader.

Subsequently, a hardware configuration of the wireless tag reader 22 will be described. FIG. 5 is a hardware block diagram of the wireless tag reader 22. The components shown in FIG. 5 are included in the main body portion 223 of the wireless tag reader 22.

The wireless tag reader 22 includes a control unit 200, a storage unit 210, an input and output controller 220, a power supply circuit 230, and a communication unit 240. The control unit 200, the storage unit 210, the input and output controller 220, the power supply circuit 230, and the communication unit 240 are connected to each other via a bus 250.

The control unit 200 includes a central processing unit (CPU) 201, a read only memory (ROM) 202, and a random access memory (RAM) 203. The CPU 201, ROM 202, and RAM 203 are connected to each other via the bus 250.

The CPU 201 controls the overall operation of the wireless tag reader 22. The ROM 202 stores various programs to be executed by the CPU 201 and various data. The RAM 203 is used as a work area of the CPU 201, and various programs and various data stored in the ROM 202 and the storage unit 210 are loaded in the RAM 203. The CPU 201 of the control unit 200 executes various control processing of the wireless tag reader 22 according to a control program stored in the ROM 202 or the storage unit 210 and loaded in the RAM 203.

The storage unit 210 is a hard disk drive (HDD) or a flash memory, and maintains stored data even if power is interrupted. The storage unit 210 stores various control programs. The control programs stored in the storage unit 210 include, for example, a program that causes the control unit 200 to perform the function of the wireless tag reader 22.

The input and output controller 220 is connected to the antenna 225 and a sensor 228. The input and output controller 220 has a function as an input and output interface for connected hardware and a function for controlling the hardware. With this configuration, the control unit 200 can transmit and receive information or data to and from the antenna 225 and the sensor 228 via the input and output controller 220, and can control the hardware based on instructions of the control unit 200. The sensor 228 detects that the wireless tag reader 22 is mounted on the shopping basket 21, and is, for example, a pressure sensitive sensor provided in the casing 221.

The power supply circuit 230 is connected to the battery 227. The power supply circuit 230 is a circuit that supplies power to each hardware of the wireless tag reader 22. The power supply circuit 230 supplies power to each hardware by stepping down a voltage supplied from the battery 227 to an operating voltage of each hardware.

The communication unit 240 is an interface for communicating with an external device. For example, the communication unit 240 connects to the portable terminal 3 and outputs commodity information read by the wireless tag reader 22 to the portable terminal 3.

Figure 6:
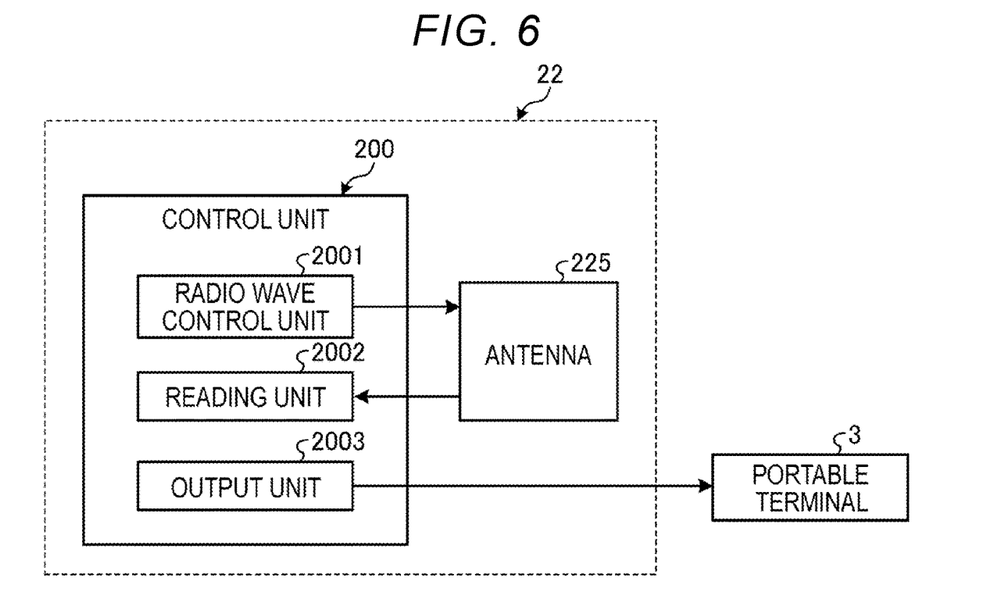
FIG. 6 is a functional block diagram of a wireless tag reader.

Next, a functional configuration of the control unit 200 of the wireless tag reader 22 will be described. FIG. 6 is a functional block diagram of the wireless tag reader 22.

The CPU 201 executes the control program stored in the ROM 202 or the storage unit 210 to perform the functions of a radio wave control unit 2001, a reading unit 2002, and an output unit 2003.

The radio wave control unit 2001 controls a radio wave to be transmitted from the antenna 225. Specifically, if the sensor 228 detects that the wireless tag reader 22 is mounted on the shopping basket 21, the radio wave control unit 2001 controls the radio wave so as to be transmitted from the antenna 225 at predetermined intervals or continuously. If the sensor 228 detects that the wireless tag reader 22 is removed from the shopping basket 21, the radio wave control unit 2001 stops transmitting the radio wave from the antenna 225. Furthermore, the radio wave control unit 2001 controls radio wave intensity of the radio wave transmitted from the antenna 225 so that the radio wave can reach a wireless tag disposed inside the holding portion 211 of the shopping basket 21, and cannot reach any wireless tag stuck to a commodity disposed on a commodity display shelf.

The reading unit 2002 reads tag information stored in the wireless tag based on the radio wave received by the antenna 225. Specifically, the reading unit 2002 reads the tag information included in the response wave transmitted by the wireless tag with respect to the inquiry wave transmitted by the antenna 225. The tag information read by the reading unit 2002 includes commodity information of the commodity to which the wireless tag is stuck.

The output unit 2003 controls the communication unit 240 to transmit or output the commodity information included in the tag information read by the reading unit 2002 to the portable terminal 3. For example, the output unit 2003 controls the communication unit 240 to output commodity information in response to an instruction signal from the portable terminal 3.

A use case of the basket device 2 having the configuration described above will be described. When shopping, a customer who visits a store takes out the shopping basket 21 from a shopping cart storage area and also takes out the wireless tag reader 22 from a charging stand. Next, as illustrated in FIG. 2, the wireless tag reader 22 is positioned on the bottom surface portion 213 of the holding portion 211 of the shopping basket 21. In this case, the outer peripheral surface of the wireless tag reader 22 fits with the lower inner peripheral surface of the holding portion 211, so that the wireless tag reader 22 is held in or mounted on the shopping basket 21. In this state, the sensor 228 detects that the wireless tag reader 22 is held in the shopping basket 21, and the wireless tag reader 22 transmits an inquiry wave from the antenna 225.

The customer moves around the store with the shopping basket 21. If there is a commodity to be purchased, the customer puts the commodity in the holding portion 211 of the shopping basket 21. The wireless tag stuck to the commodity in the holding portion 211 receives the inquiry wave from the antenna 225 and transmits a response wave to the antenna 225.

In the wireless tag reader 22, the antenna 225 receives the response wave from the wireless tag, and the reading unit 2002 reads commodity information from the response wave. The read commodity information is output by the output unit 2003 from the communication unit 240 to the portable terminal 3. The portable terminal 3 stores the commodity information and displays the commodity information on its own display unit.

Since the reading unit 2002 reads commodity information at predetermined intervals or continuously, the commodity information of the commodity can be read as soon as the customer puts a commodity in the shopping basket 21. The reading unit 2002 repeatedly reads the commodity information of the commodity stored in the holding portion 211, and executes a duplication check to prevent double reading of the repeatedly read commodity information based on an identifier of the read wireless tag. With this configuration, the reading unit 2002 can read the commodity information of the commodities in the shopping basket 21 without duplication. Then, if the reading unit 2002 reads new commodity information, the output unit 2003 controls the communication unit 240 to output the new commodity information to the portable terminal 3. The portable terminal 3 sequentially stores the received commodity information and displays the received commodity information on its own display unit. The output unit 2003 may control the communication unit 240 to repeatedly output all of the commodity information repeatedly read by the reading unit 2002. In such a case, the portable terminal 3 compares all the received commodity information with the previously received and stored commodity information, and adds, stores, and displays the newly received commodity information.

If the customer performs checkout, the commodity information stored in the portable terminal 3 is transmitted to the checkout machine 4 according to the operation of the customer. The checkout machine 4 executes checkout processing based on the received commodity information.

If the reading unit 2002 reads commodity information during the shopping described above, depending on the positional relationship between the wireless tag stuck to the commodity in the holding portion 211 and the antenna 225 of the wireless tag reader 22, the transmission and reception of radio waves between the antenna 225 and the wireless tag may not be good and the reading unit 2002 may not be able to read the commodity information.

However, according to the wireless tag reader 22 of this embodiment, since the shopping basket 21 is moved during shopping, an inertial force is applied to the wireless tag reader 22, and the main body portion 223 including the antenna 225 moves along the bottom surface portion 213 of the shopping basket 21. For that reason, the positional relationship between the antenna 225 and the wireless tag changes as the shopping basket 21 moves during shopping. Accordingly, tag information of a wireless tag that could not be read at the point in time if the commodity was in the holding portion 211 can also be read due to the change in the positional relationship between the antenna 225 and the wireless tag, and performance for reading the commodity information of the commodity in the shopping basket 21 is improved. Moreover, the wireless tag reader of this embodiment improves the reading performance of the reading unit 2002 by a simple configuration in which the antenna 225 is attached to the casing 221 via an elastic member in view of the fact that the shopping basket 21 is moved by the customer during use and to which inertial force is applied. Accordingly, a drive mechanism for moving the antenna 225 does not need to be provided, and the configuration of the wireless tag reader 22 can be prevented from becoming complicated.

According to the wireless tag reader 22 of this embodiment, the main body portion 223 elastically supported on the casing 221 includes not only the antenna 225 but also electrical components of the wireless tag reader 22 such as the control device 226 and the battery 227. For that reason, even if an impact is applied when the wireless tag reader is being removed from the shopping basket 21, those components can be protected by a cushioning action by the coil springs 224. That is, the coil springs 224 have a function of movably supporting the antenna 225 when the wireless tag reader 22 is being held in the shopping basket 21, and a function of a cushioning member for protecting the device components when the wireless tag reader 22 is removed from the shopping basket 21. For that reason, a cushioning member for protecting the device components does not need to be separately provided for when the wireless tag reader 22 is not attached to the shopping basket 21.

According to the wireless tag reader 22 of this embodiment, by making the wireless tag reader 22 detachable from the shopping basket 21, there is an advantage that the store does not need to prepare as many wireless tag readers 22 as the shopping baskets 21 and the shopping basket 21 does not disturb charging of the battery 227.

The wireless tag reader 22 may be configured to be fixedly provided on the shopping basket 21. Furthermore, a configuration in which the antenna 225 is attached to the casing 221 via the coil springs 224 is adopted as a configuration in which the antenna 225 can be moved with respect to the casing 221 by the inertial force applied to the shopping basket 21, but is not limited to this configuration. For example, a rail on which the antenna 225 can slide may be provided on the bottom surface of the casing 221.

Second Embodiment

Figure 7:
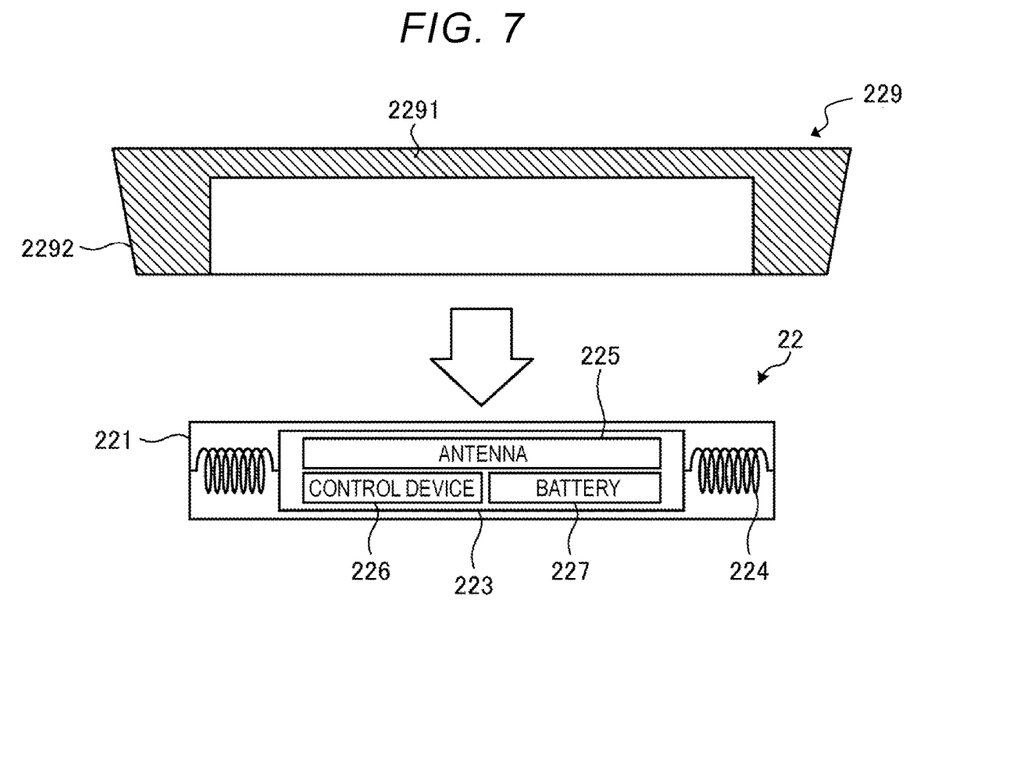
FIG. 7 is a diagram illustrating a holding member and a wireless tag reader according to a second embodiment in an unattached state.
Figure 8:
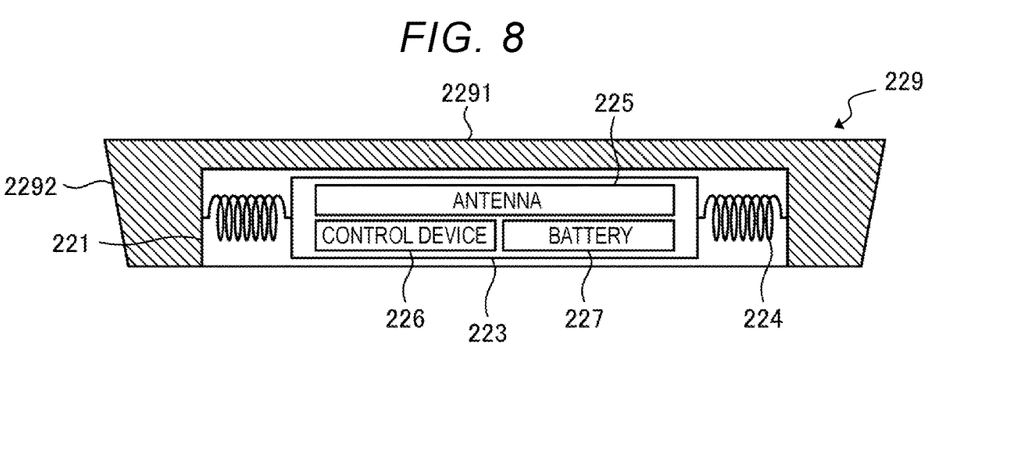
FIG. 8 is a diagram illustrating a holding member and a wireless tag reader according to a second embodiment in an attached state.

The second embodiment differs from the first embodiment in that the wireless tag reader 22 includes a detachable holding member 229. FIG. 7 is a diagram illustrating the wireless tag reader 22 and the holding member 229 in an unattached state. FIG. 8 is a diagram illustrating the wireless tag reader 22 and the holding member 229 in an attached state. In the following description, the same reference numerals are given to the same configurations as those of the first embodiment, and the description thereof will be omitted.

The wireless tag reader 22 includes the holding member 229. The holding member 229 is detachably provided on the casing 221 and holds the casing 221 in the shopping basket 21. Specifically, the holding member 229 is formed of an elastic member such as rubber and is mounted on the casing 221 so as to cover the casing 221, and fits into the holding portion 211 of the shopping basket 21 to hold the casing 221 in the shopping basket 21.

As illustrated in FIG. 7, the holding member 229 includes a top surface portion 2291 and a side surface portion 2292. The top surface portion 2291 is formed in a rectangular shape and covers the upper surface of the casing 221 when the holding member 229 is mounted on the casing 221. The side surface portion 2292 is formed so as to project downward from four sides of the top surface portion 2291, and covers the side surfaces of the casing 221 when the holding member 229 is mounted on the casing 221. In a left and right direction in FIG. 7, a length between the opposing inner surfaces of the side surface portion 2292 is formed to be slightly shorter than a full, expanded width of the casing 221. In the direction orthogonal to the page surface in FIG. 7, the length between the opposing inner surfaces of the side surface portion 2292 can be formed to be substantially equal to the width of the casing 221 while still permitting accommodation of the casing 221 within the holding member 229.

When the holding member 229 is placed in contact with the housing 221 with side surface(s) 2292 expand in the left and right direction in FIG. 7 but the side surface portions 2292 return towards the unexpanded state, thus the holding member 229 is held against the casing 221, as illustrated in FIG. 8. A plurality of types of holding members 229 having different external dimensions can be prepared, and a holding member 229 can be appropriately selected according to the size of the shopping basket 21 to which the wireless tag reader 22 is to be attached. Other than this, the method of using the basket device 2 is the same as that of the first embodiment.

According to the wireless tag reader 22 of this second embodiment, by selecting the appropriate holding member 229 to be mounted on the casing 221, the wireless tag reader 22 can fit into shopping baskets 21 of different sizes.

Accordingly, since different casings suitable for different shopping baskets 21 need not to be prepared, cost reduction and efficiency can be achieved.

Third Embodiment

Figure 9:
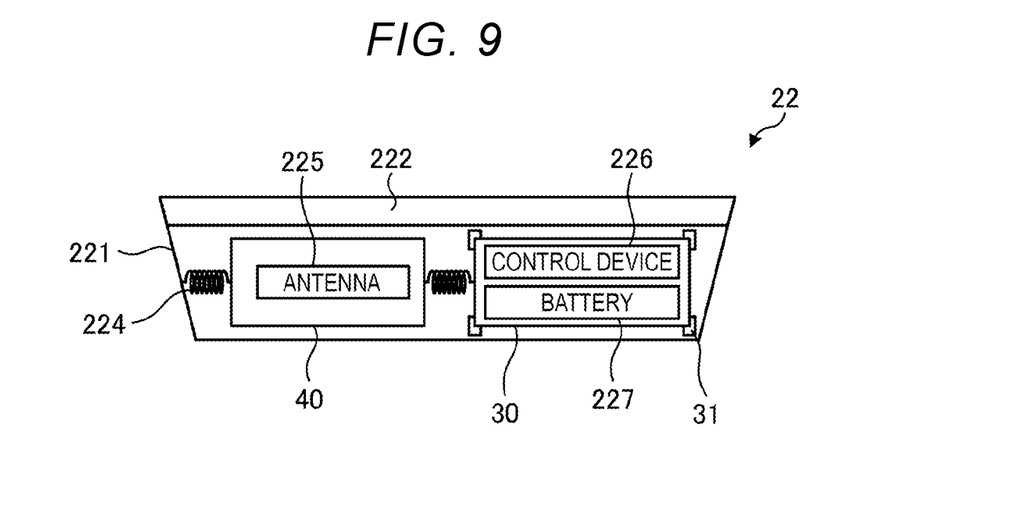
FIG. 9 is a diagram schematically illustrating an internal structure of a wireless tag reader according to a third embodiment.
Figure 10:
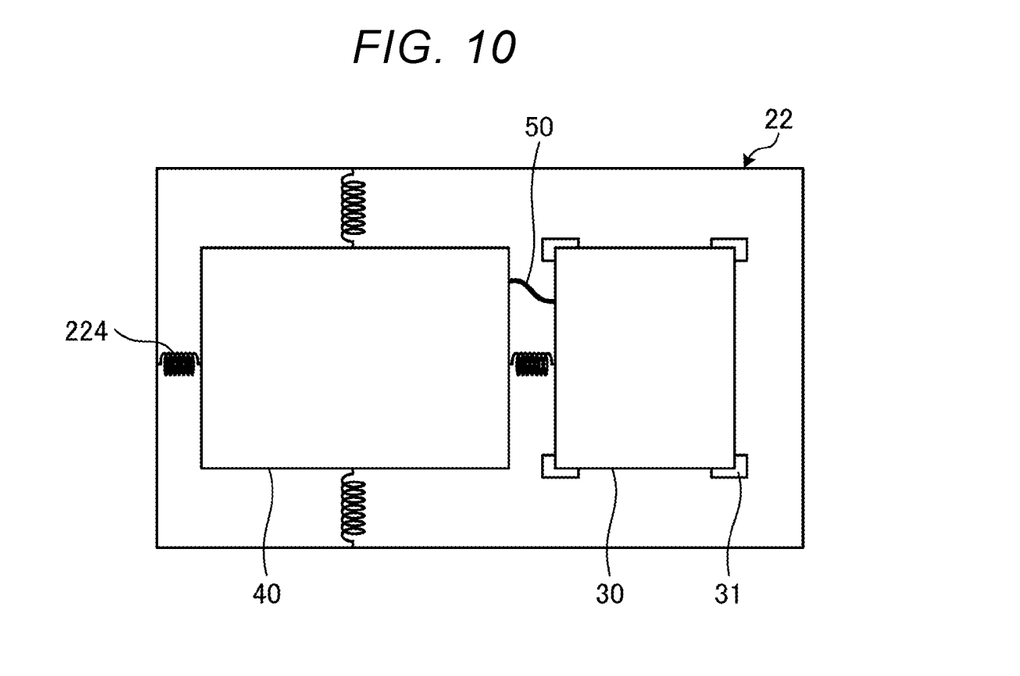
FIG. 10 is a diagram schematically illustrating a wireless tag reader according to a third embodiment when viewed from an upper surface thereof.

The third embodiment differs from the first embodiment and the second embodiment in that the control device 226 and the battery 227 are fixed to the casing 221. FIG. 9 is a diagram schematically illustrating an internal structure of the wireless tag reader 22. FIG. 10 is a diagram schematically illustrating the wireless tag reader 22 when viewed from the upper surface thereof. In the following description, the same reference numerals are given to the same configurations as those of the first embodiment and the second embodiment, and the description thereof will be omitted.

As illustrated in FIGS. 9 and 10, a reader housing 30 and an antenna housing 40 are provided in the casing 221.

The reader housing 30 is fixed to the casing 221 via support members 31. The support members 31 are provided at the upper and lower positions of four corners of the reader housing 30 of a rectangular parallelepiped shape. The reader housing 30 houses the parts of the wireless tag reader 22 excluding the antenna 225, such as the control device 226 and the battery 227.

The antenna housing 40 is provided so as to be movable with respect to the casing 221 via the coil springs 224. The antenna housing 40 houses the antenna 225. The antenna 225 is connected to the control device 226 via a coaxial cable 50 (see FIG. 10). The coaxial cable 50 connects the antenna 225 and the control device 226 with looseness that can allow the antenna housing 40 to move with respect to the reader housing 30 fixed to the casing 221.

The wireless tag reader 22 is used by being attached to the bottom surface portion 213 of the shopping basket 21, similarly to in the first embodiment.

According to the wireless tag reader 22 of this embodiment, since the shopping basket 21 is moved during shopping, similarly to the first embodiment, an inertial force is applied to the wireless tag reader 22 and the antenna housing 40 moves along the bottom surface portion 213 of the shopping basket 21. For that reason, the positional relationship between the antenna 225 and the wireless tag changes as the shopping basket 21 moves during shopping, and performance for reading commodity information about a commodity in the shopping basket 21 is improved. In addition, since the control device 226 and the battery 227, which are relatively heavy in weight, of the wireless tag reader 22 do not move with respect to the shopping basket 21, the impact on the customer with the shopping basket 21 can be reduced.

As described above, the wireless tag reader 22 according to the embodiments described above includes the antenna 225 that transmits and receives the radio wave to and from the wireless tag stuck to a commodity, the casing 221 that houses the antenna 225, the reading unit 2002 that reads tag information stored in the wireless tag based on the radio wave received by the antenna 225, and the coil spring 224 that elastically supports the antenna 225 so as to be movable with respect to the casing 221.

With this configuration, by providing the wireless tag reader 22 in the shopping basket 21, the positional relationship between the antenna 225 and the wireless tag stuck to a commodity in the shopping basket 21 can be changed as the shopping basket 21 is moved, and thus the chance for reading the tag information of the wireless tag is increased, thereby the reading performance of the wireless tag reader 22 can be improved.

The antenna 225 can be moved by the inertial force accompanying the movement of the shopping basket 21 without giving an impact to the antenna 225.

Furthermore, the wireless tag reader 22 of the embodiments described above includes the main body portion 223 that houses the antenna 225, the control device 226 that functions as the reading unit 2002, and the battery 227 that supplies power to the control device 226, and the coil spring 224 (or other elastic member) elastically supports the main body portion 223 on the casing 221.

With this configuration, even if an impact is applied when the wireless tag reader 22 is being removed from the shopping basket 21, the components in the main body portion 223 can be protected by the cushioning action by the elastic member. The coil spring 224 can have a function of movably supporting the antenna 225 while the wireless tag reader 22 is held in the shopping basket 21, and also function as a cushioning member for protecting the components when the wireless tag reader 22 is removed from the shopping basket 21. As such, the overall structure of the wireless tag reader 22 can be simplified since coil spring 224 (elastic member) can have a plurality of functions.

In addition, the wireless tag reader 22 according to the second embodiment includes a holding member 229 that is detachably provided on the casing 221 and holds the casing 221 in the shopping basket 21.

With this configuration, by preparing a plurality of types of holding members 229 having different sizes, the wireless tag reader 22 can be mounted on various shopping baskets 21 having different sizes. Accordingly, the casing 221 does not need to be prepared for shopping baskets 21 having different sizes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reader, comprising:
   an antenna;
   a control device configured to read tag information stored in a wireless tag based on a radio wave received by the antenna from the wireless tag;
   a battery configured to supply power to the control device;
   a main body portion in which the antenna, the control device, and the battery are disposed;
   an elastic member; and
   a casing in which the main body portion and the elastic member are disposed, wherein
   the elastic member contacts an inner surface of the casing and an outer surface of the main body portion.

2. The wireless tag reader according to claim 1, wherein the casing has a flat surface parallel to the antenna.

3. The wireless tag reader according to claim 2, further comprising:
   a flat placement portion fixed to the casing, wherein the flat placement portion is a resin material.

4. The wireless tag reader according to claim 1, wherein the casing has a trapezoidal cross-sectional shape.

5. The wireless tag reader according to claim 1, further comprising:
a plurality of elastic members between inner surfaces of the casing and the antenna.

6. The wireless tag reader according to claim 1, further comprising:
a holding member that is formed of an elastic material and has a recess into which the casing fits.

7. The wireless tag reader according to claim 6, wherein the casing is detachable from the holding member.

8. A wireless tag reader comprising:
an antenna;
a first housing that houses the antenna;
a control device configured to read tag information stored in a wireless tag based on a radio wave received by the antenna from the wireless tag;
a second housing that houses the control device;
an elastic member; and
a casing in which the first and second housings and the elastic member are disposed, wherein
the elastic member contacts an inner surface of the casing and an outer surface of the first housing.

9. The wireless tag reader according to claim 8, further comprising:
another elastic member between the first and second housings, wherein
the second housing is fixed to the casing.

10. A basket device, comprising:
a basket in which an article with a wireless tag can be placed; and
a wireless tag reader on a bottom surface of the basket and including:
an antenna,
a control device configured to read tag information stored in the wireless tag based on a radio wave received by the antenna from the wireless tag,
a battery configured to supply power to the control device,
a main body portion in which the antenna, the control device, and the battery are disposed,
an elastic member, and
a casing in which the main body portion and the elastic member are disposed, wherein
the elastic member contacts an inner surface of the casing and an outer surface of the main body portion.

11. The basket device according to claim 10, wherein the casing substantially covers the bottom surface of the basket.

12. The basket device according to claim 10, wherein the elastic member is a spring.

13. The basket device according to claim 10, wherein the elastic member comprises a rubber material.

14. The basket device according to claim 10, wherein the casing has a flat surface parallel to the antenna.

15. The basket device according to claim 14, further comprising:
a flat placement portion fixed to the casing, wherein the flat placement portion is a resin material.

16. The basket device according to claim 10, wherein the casing has a trapezoidal cross-sectional shape.

17. The basket device according to claim 10, wherein the wireless tag reader further includes a plurality of elastic members between inner surfaces of the casing and the antenna.

* * * * *